(12) United States Patent
Matsuzaka

(10) Patent No.: US 6,236,420 B1
(45) Date of Patent: May 22, 2001

(54) SUBLIMATING CARD PRINTING APPARATUS AND METHOD

(75) Inventor: Hideki Matsuzaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/300,181

(22) Filed: Apr. 27, 1999

(30) Foreign Application Priority Data

Apr. 27, 1998 (JP) .................................................. 10-132641

(51) Int. Cl.[7] .................................................. B41J 2/385
(52) U.S. Cl. .......................................... 347/170; 347/171
(58) Field of Search .................................. 235/449, 443; 400/207, 120.01, 662; 347/215, 318, 170, 171

(56) References Cited

U.S. PATENT DOCUMENTS

| | | | |
|---|---|---|---|
| 5,447,382 | * 9/1995 | Yui et al. | 400/207 |
| 5,959,278 | * 9/1999 | Kobayashi et al. | 235/449 |
| 5,962,832 | * 10/1999 | Dorner | 347/218 |
| 6,029,895 | * 2/2000 | Ito et al. | 235/493 |

* cited by examiner

Primary Examiner—N. Le
Assistant Examiner—K. Feggins
(74) Attorney, Agent, or Firm—Malcolm B. Wittenberg

(57) ABSTRACT

A sublimating card printing apparatus, the size of which is reduced with a simple construction while providing multiple functions. A sublimating card printing apparatus for recording predetermined information in a magnetic recording medium and/or semiconductor memory provided on a card material and printing an image based on a supplied printing signal on the card material. The apparatus comprises a rotary transporting device for switching a transporting direction of the card material, provided along a linear transport path of the card material, a card tray for containing the card material transported by the rotary transporting device where errors occur in recording onto the magnetic recording medium or memory recording medium, and both a memory recording/reproducing device and a magnetic recording/reproducing device provided on the rotary transport path through the rotary transporting device, the length of the transport path thereby being reduced and the card tray being contained in the apparatus, the whole apparatus thereby being minimized in size and complexity while retaining multiple functions.

14 Claims, 13 Drawing Sheets

SUBLIMATING CARD PRINTING APPARATUS AND METHOD

BACKGROUND OF THE INVENTION

1. Field of the Invention

The present invention relates generally to a sublimating card printing apparatus and a sublimating card printing method, and more particularly, to a thermal transfer type card printer which prints a color image over a surface of a printing medium of a card type made of a plastic material.

2. Description of the Background Art

A thermal transfer type card printer of the type mentioned above presses a thermal transfer head against a platen with an ink ribbon and a card-shaped printing medium interposed therebetween. This combination thereby thermally transfers a variety of dyes coated on the ink ribbon onto a surface of the card-shaped printing medium, in a manner based on information on a predetermined color image to print the color image over the surface of the card-shaped printing medium.

In recent years, card-shaped printing media having such color images printed thereon have been widely used as magnetic cards, IC (Integrated Circuit) cards, also referred to in the art as "smart cards", and cards provided with both features (hereinafter called the "magnetic IC card"), which have a variety of information recorded therein. For example, they are used as a so-called ID (identification) card for use in identification or the like of a person who enters or exits, a credit card for conducting a credit account for a financial institution such as a bank, a post office or the like, and so on.

These magnetic cards, IC cards and magnetic IC cards have been standardized in terms of their outer dimensions, and the positions at which a magnetic stripe, an IC memory, or both are placed or formed thereon, in accordance with the ISO (International Organization for Standardization) standard and the JIS (Japan Industrial Standard) standard.

For the magnetic IC card, the ISO standard specifies that a magnetic stripe having a predetermined width is formed along an edge in a longitudinal direction on one side of a card-shaped printing medium, and an IC memory is embedded at a predetermined position in a front end portion of the other side. The JIS standard, on the other hand, specifies that a magnetic stripe having a predetermined width is formed along an edge in a longitudinal direction on one side of a card-shaped printing medium, and an IC memory is embedded at a predetermined position in a front end portion of that same side.

Conventional card printers provide a card rotating means along a transport path of a card material, and reverse the position of a card by rotating the card rotating means, thereafter printing a predetermined image and information on the card. However, complications are introduced by the fact that the magnetic IC card has an IC memory recording/reproducing means different from a magnetic recording/reproducing means. In a magnetic IC card, failure may occur at the time of recording to an IC memory in addition to the time of magnetically recording. The transport path therefore becomes longer if the IC memory recording/reproducing means and a card tray are set linearly along the transport path, having a larger size than desired. It would therefore be desirable to provide a single apparatus capable of supporting a sequence of steps involving printing a color image on one or the other side (or both sides) of such a magnetic IC card and recording predetermined information on either or both of a magnetic stripe and an IC memory provided on one or the other side (or both) as required while providing such functionality within a compact space.

SUMMARY OF THE INVENTION

It is therefore a first advantage of the present invention to provide a sublimating card printing apparatus capable of providing full functionality while being minimized in size with a simple construction. The sublimating card printing apparatus for printing an image based on a supplied printing signal on one or the other side of a card material (or both sides), comprises a magnetic recording/reproducing means, an image printing means, a rotary transporting means rotatably disposed on a last part of a transport path of a card for rotating a transport direction of the card material by a predetermined angle from a linear direction, an IC memory recording/reproducing means for carrying in, recording/reproducing, and carrying out a card via the rotary transporting means, and a card tray for containing the card via the rotary transporting means. Thereby, the length of the transport path is significantly reduced and the construction of the whole apparatus can be also significantly minimized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

Figure 1:
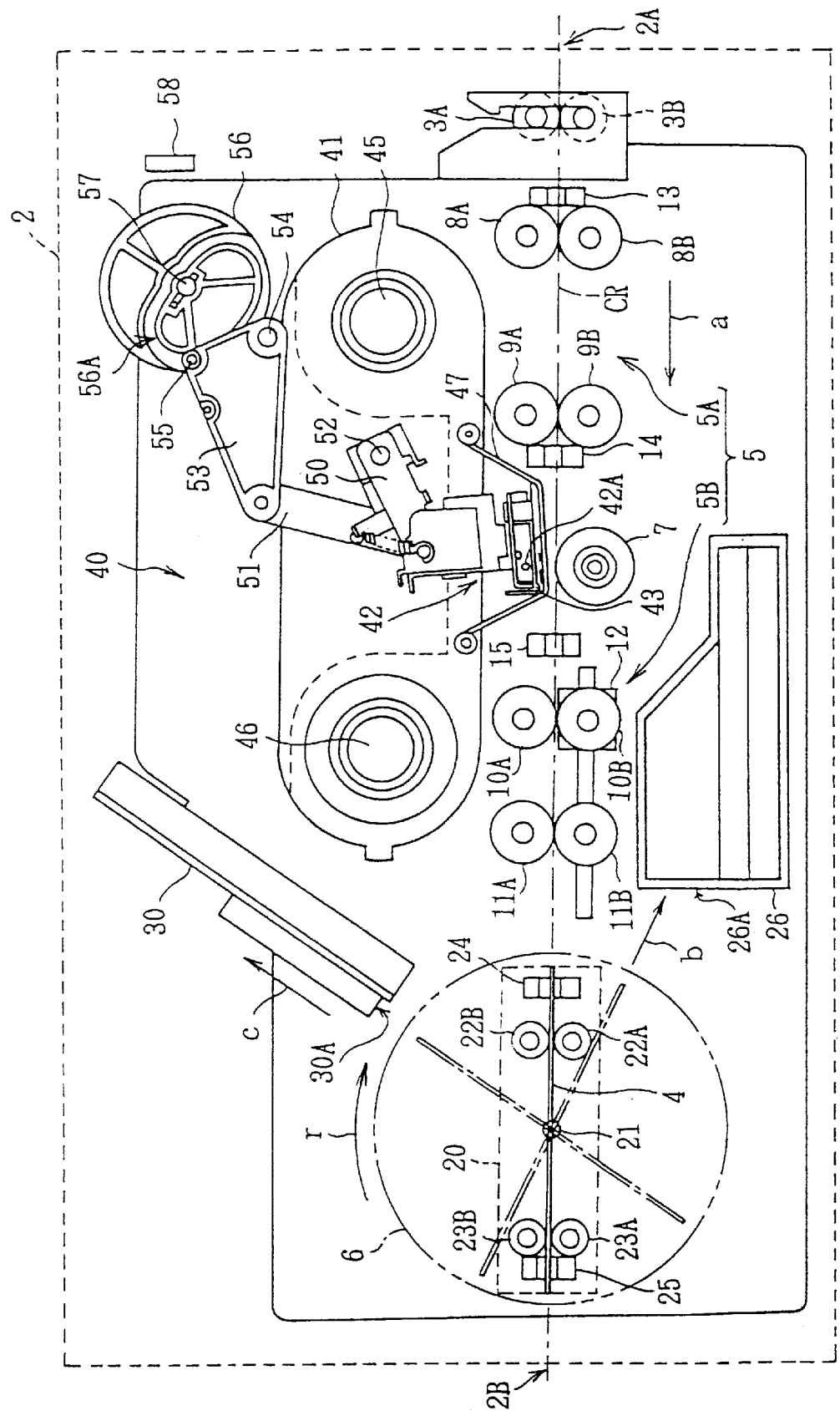
FIG. 1 is a schematic lateral view illustrating a card printer according to one embodiment of the present invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF PREFERRED AND ALTERNATIVE EMBODIMENTS (1) General Configuration of an Inventive Card Printer Referring first to FIG. 1, a card printer, generally designated by reference numeral 1, is designed to lead a magnetic IC card 4 conforming to the ISO standard, inserted from a card insertion port 2A on an end surface of a housing 2 through cleaning rollers 3A, 3B, to a card transport unit 5 and a subsequent rotary transport unit 6 along a transport path CR.

The card transport unit 5 is composed of first and second transport sections 5A, 5B disposed in front of and behind a platen 7 along the transport path CR. The first and second transport section 5A, 5B are provided with four sets of transport rollers 8A to 11A and 8B to 11B, respectively, which are rotatably mounted along the transport path CR at predetermined intervals.

In operation, a plurality of upper transport rollers 8A, 9A, 10A, and 11A are rotated in the same direction relative to one another, as dictated by the rotation of a driving motor (not shown), while the lower transport rollers 8B to 11B are urged to remain in contact with the corresponding upper transport rollers 8A to 11A. With the structure as mentioned, a magnetic IC card 4, inserted between the upper and lower transport rollers 8A to 11A and 8B to 11B, is fed forwardly or backwardly along the transport path CR in accordance with the rotation of the rotational direction of the upper transport rollers 8A to 11A.

A second transport section 5B is provided with a magnetic head 12 disposed at a predetermined position opposite to upper transport roller 10A and juxtaposed with lower transport roller 10B. A magnetic head 12 is exposed onto and retreated from transport path CR by a predetermined driving mechanism (not shown) for driving the same, as will be understood by one skilled in the art to which the present invention pertains.

In addition, optical sensors 13, 14, 15 are disposed in front of and behind the first transport section 5A and in front of the second transport section 5B such that the presence or absence of a magnetic IC card 4 fed along the transport path CR is detected thereby.

When the magnetic IC card 4 inserted from the outside is actually detected by the optical sensor 13 disposed in front of the first transport section 5A, the card transport unit 5 drives the upper transport rollers 8A to 11A of the first and second transport units 5A, 5B to rotate in a predetermined direction to direct the magnetic IC card 4 along the transport path CR in a direction indicated by an arrow a.

Simultaneously, the card transport unit 5 rotates the platen 7 in the same direction in synchronization with the rotation of the upper transport rollers 8A to 11A of the first and second transport sections 5A, 5B. This allows the magnetic IC card 4 fed from the first transport section 5A to pass over the platen 7 and reach the second transport section 5B.

Subsequently, when the magnetic IC card 4 is detected by the optical sensor 15 disposed in front of the second transport section 5B, a magnetic recording/reproducing unit (not shown) exposes the magnetic head 12 on the transport path CR such that the magnetic head 12 comes in contact with a magnetic stripe formed on one side of the magnetic IC card 4. Next, after recording predetermined information on the magnetic stripe of the magnetic IC card 4 through the magnetic head 12, the magnetic recording/reproducing unit reproduces the recorded information to determine whether or not any recording errors are found on the magnetic IC card 4.

Subsequently, the card transport unit 5 passes the magnetically recorded magnetic IC card 4 between the transport rollers 11A and 11B of the second transport section 5B to a rotary transport unit 6.

The rotary transport unit 6 has a rotary mechanism 20 supported rotatably about a rotating shaft 21 in a direction indicated by an arrow r or in the direction opposite thereto. The rotary mechanism 20 includes a first pair of flipper rollers 22A, 22B and a second pair of flipper rollers 23A, 23B which are mounted for pivotal movements while maintaining a symmetrical positional relationship around rotating shaft 21.

In this case, the first pair of flipper rollers 22A, 22B and the second pair of flipper rollers 23A, 23B are disposed such that the flipper rollers 22A, 23A on a lower side receive the rotations of respective driving motors (not shown) to rotate in the same direction in association with each other, while the flipper rollers 22B, 23B on the other side are urged to contact with the corresponding flipper rollers 22A, 23A on the lower side. With the structure as mentioned, the magnetic IC card 4 inserted between the first pair of flipper rollers 22A, 22B and/or between the second pair of flipper rollers 23A, 23B is driven forwardly or backwardly on the transport path CR with rotation of the flipper rollers 22A, 23A on the lower side.

In addition, first and second optical sensors 24, 25 are disposed outside the first pair of flipper rollers 22A, 22B (that is, in the centrifugal direction of rotating shaft 21) and outside the second pair of flipper rollers 23A, 23B, respectively, for detecting the presence or absence of magnetic IC card 4 sent thereto along transport path CR.

Rotary transport unit 6 preferably rotates the rotary mechanism 20 by a predetermined angular distance in a direction indicated by r or in the direction opposite thereto, when the magnetic recording/reproducing unit starts magnetically recording on the magnetic IC card 4, to prevent the leading end of the magnetic IC card 4 fed along the transport path CR during the magnetic recording from coming in contact with the first pair of flipper rollers 22A, 22B and the second pair of flipper rollers 23A, 23B. This can effectively prevent the magnetic IC card 4 from contacting any of the rollers during the magnetic recording thereby minimizing or blocking the introduction of jitter into information recorded on magnetic IC card 4.

Also, when accepting the magnetic IC card 4 fed from the card transport unit 5 after information is magnetically recorded, rotary transport unit 6 positions the rotary mechanism 20 at such a position that the first pair of flipper rollers 22A, 22B and the second pair of flipper rollers 23A, 23B are arranged in parallel in the direction indicated by the arrow a (hereinafter, this position is called the "transport reference position").

Subsequently, when the magnetic IC card 4 fed from the card transport unit 5 is detected by the first optical sensor 24, the rotary transport unit 6 drives the first and second flipper rollers 22A, 23A on the lower side to rotate, thereby feeding the magnetic IC card 4 between the second pair of flipper rollers 23A and 23B along the transport path CR while sandwiching the magnetic IC card 4 between the first pair of flipper roller 22A, 22B. Next, as the magnetic IC card 4 is detected by the second optical sensor 25, the rotary transport unit 6 stops rotating the first and second flipper rollers 22A, 23A on the lower side. As a result, the magnetic IC card 4 is left sandwiched both between the first pair of flipper rollers 22A, 22B and between the second pair of flipper rollers 23A, 23B.

In this event, if the magnetic recording/reproducing unit determines that any recording error exists in the magnetic IC card 4, the rotary transport unit 6 rotates the rotary mechanism 20, now at the transport reference position, in the direction indicated by the arrow r by a predetermined angular distance to align the magnetic IC card 4 with a position corresponding to an inlet port 26A of an unacceptable card tray 26 (hereinafter, this position is called the "unacceptable card discharge position"). Subsequently, the rotary transport unit 6 drives the first and second flipper rollers 22A, 23A on the lower side to rotate, thereby moving the magnetic IC card 4 in a direction indicated by an arrow b to discharge the same into the inlet port 26A leading to the unacceptable card tray 26.

Conversely, if the magnetic recording/reproducing unit determines that no error is found in the magnetic IC card 4, the rotary transport unit 6 rotates the rotary mechanism 20, now at the transport reference position, in the direction indicated by the arrow r by a predetermined angular distance to align the magnetic IC card 4 to a position corresponding to an insert port 30A of an IC recording/reproducing unit 30 (hereinafter, this position is called the "IC recording/reproducing position). Subsequently, the rotary transport unit 6 drives the first and second flipper rollers 22A, 23A on the lower side to rotate, thereby moving the magnetic IC card 4 in a direction indicated by an arrow c to insert the magnetic IC card 4 into the insert port 30A of the IC recording/reproducing unit 30.

The IC recording/reproducing unit 30 brings an interface connector (not shown) in contact with each of terminals of the IC memory disposed on one side of the magnetic IC card 4 to record predetermined information, which has been previously set therefor, and then reproduces the just-recorded information to determine whether any recording errors occurred.

Next, if the IC recording/reproducing unit 30 discovers any errors, the rotary transport unit 6 rotates the first and second flipper rollers 22A, 23A on the lower side to draw the magnetic IC card 4 in the direction opposite to the direction indicated by the arrow c. Then, the rotary mechanism unit 20 remaining at the IC recording/reproducing position is rotated in the direction opposite to the direction indicated by the arrow r by a predetermined angular distance to align the magnetic IC card 4 to the unacceptable card discharge position. Subsequently, the rotary transport unit 6 rotates the first and second flipper rollers 22A, 23A on the lower side to move the magnetic IC card 4 in the direction indicated by the arrow b, to discharge the same into the inlet port 26A of the unacceptable card tray 26.

Conversely, if the IC recording/reproducing unit 30 determines that no error is found in the magnetic IC card 4, the rotary transport unit 6 rotates the rotary mechanism 20, now at the IC recording/reproducing position, in the direction opposite to the direction indicated by the arrow r by a predetermined angular distance, to align the magnetic IC card 4 to the original transport reference position. Subsequently, the rotary transport unit 6 drives the first and second flipper rollers 22A, 23A on the lower side to rotate, thereby moving the magnetic IC card 4 in the direction opposite to the direction indicated by the arrow a to feed the same to the second transport section 5B.

The card transport unit 5 passes the magnetic IC card 4 sent thereto through the second transport section 5B over the platen 7 to the first transport section 5A. If the optical sensor 14 disposed behind the first transport section 5A detects that the magnetic IC card 4 has passed, the rotary transport unit 6 stops rotating the upper transport rollers 8A to 11A of the first and second transport sections 5A, 5B. In this event, the magnetic IC card 4 has its head aligned to a color image printing unit 40 disposed at a position opposite to the platen 7.

In the color image printing unit 40, a thermal transfer head 43 supported by a leading end of a head unit 42 is pressed against the platen 7 through a rolled ink ribbon 47 supported by a supply reel 45 and a wind-up real 46 and the magnetic IC card 4 positioned on the platen 7. The thermal transfer head 43 is heated in this state based on predetermined printing data to thermally transfer ink on the ink ribbon 47 over the opposing surface of the magnetic IC card 4.

In a preferred embodiment, the rolled ink ribbon 47 is accommodated in a ribbon cassette 41 which is removably loaded between the color image printing unit 40 and the platen 7 through a cassette insert port (not shown) formed through a side wall of the housing 2.

The supply real 45 is provided with a torque limiter (not shown) for applying a predetermined torque during rotation, so that the ink ribbon 47 is always applied with a back tension. Further, an optical sensor (not shown) is disposed near the supply real 45 for detecting the diameter of the rolled ink ribbon 47 to detect the tension of the ink ribbon 47, such that the wind-up reel 46 can be controlled in terms of its winding state.

The head unit 42 in the color image printing unit 40 has a rear end to which one end of a supporting member 50 and one end of a pressure lever 51 are coaxially mounted, and the supporting member 50 has the other end mounted to a fixed shaft 52 for pivotal movements. A corner of a connecting member 53, having a substantially triangular shape, is pivotally mounted to the other end of the pressure lever 51. Another one of the remaining two corners of the connecting member 52 is pivotally mounted to a fixed shaft 54, and the other corner is engaged with a disk cam 56 through a pin 55.

The disk cam 56 is secured to a head driving shaft 57 which is a driving shaft for a head motor (not shown), and also serves as a cam shaft for the disk cam 56. The disk cam 56 is also formed with a cam groove 56A of a predetermined shape in the inner side surface. With the structure mentioned above, the pin 55 mounted at a corner of the connecting member 53 can slide along the cam groove 56A formed in the disk cam 56. A rotating angle of the disk cam 56 with respect to the head driving shaft 57 is detected by a head position sensor 58, such that the color image printing unit 40 can control the level of the head unit 42 as required based on the angle detected.

As described above, the color image printing unit 40 includes a cam mechanism comprising the disk cam 56, the pin 55 and the connecting member 53 with the head driving shaft 57 serving as a cam shaft, as well as the fixed shafts 52, 54, so that the connecting member 53, the pressure lever 51 and the supporting member 50 constitute a link mechanism.

In addition, the head unit 42 is formed on both sides of a leading end thereof with a pair of protrusions 42A which slide along guide grooves, for positional restriction formed in a supporting plate (not shown) within the housing 2, during rotation of the supporting member 50, such that the head unit 42 can be moved while receiving positional restriction in a direction closer to or away from the platen 7 (i.e., in a linear direction).

Figure 2:
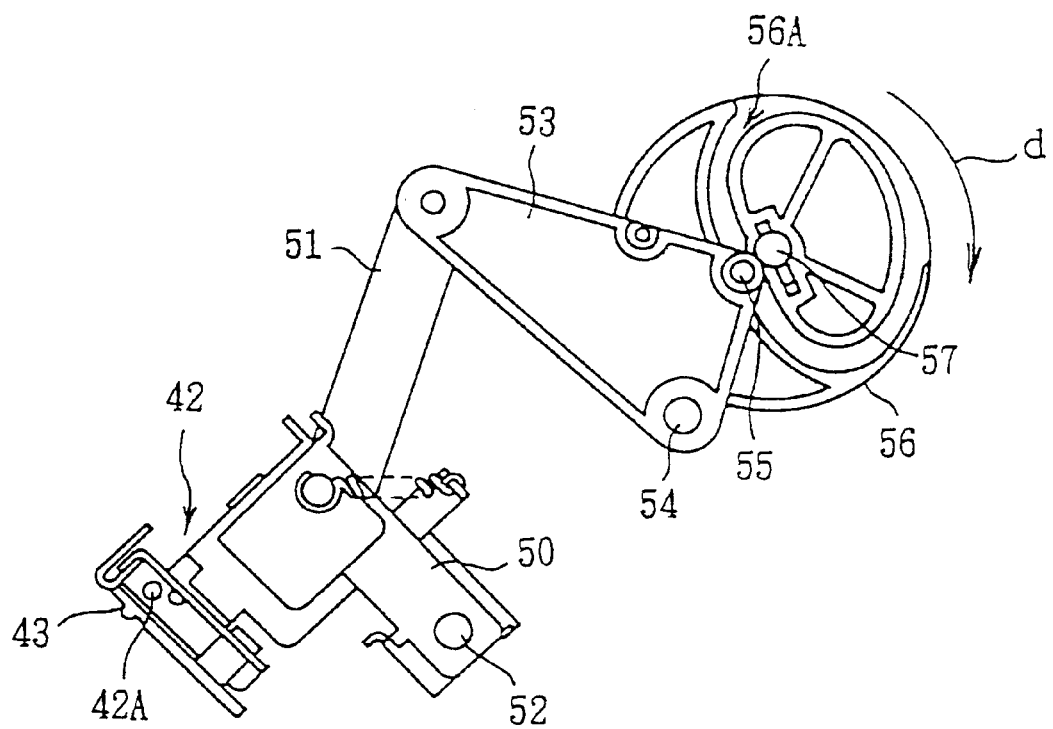
FIG. 2 is a schematic diagram illustrating an initial position of a head unit shown in FIG. 1.
Figure 2:
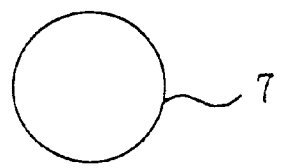

Next, a description will be provided of how the color image printing unit 40 performs a printing operation. When the ribbon cassette 41 is first loaded into the housing 2 through the cassette insert port, the color image printing unit 40 stays at a predetermined position (hereinafter, this position is called the "initial position") at which the head unit 42 is sufficiently spaced from the platen 7, as illustrated in FIG. 2.

In this state, when the optical sensor 14 behind the first transport section 5A detects that a magnetic IC card 4 has been transported to have its head aligned to the color image printing unit 40, the color image printing unit 40 rotates the disk cam 56 in response to a driven head motor in a direction indicated by an arrow d with the head driving shaft 57 serving as a cam shaft. Simultaneous with this rotation, the pin 55 attached at a corner of the connecting member 53 slides along the cam groove 56A formed in the disk cam 56 to cause the connecting member 53 to rotate about the fixed shaft 54 in a direction indicated by an arrow e, and also to cause the supporting member 50 to rotate about the fixed shaft 52 in a direction indicated by an arrow f through the pressure lever 51, as illustrated in FIG. 3.

Figure 3:
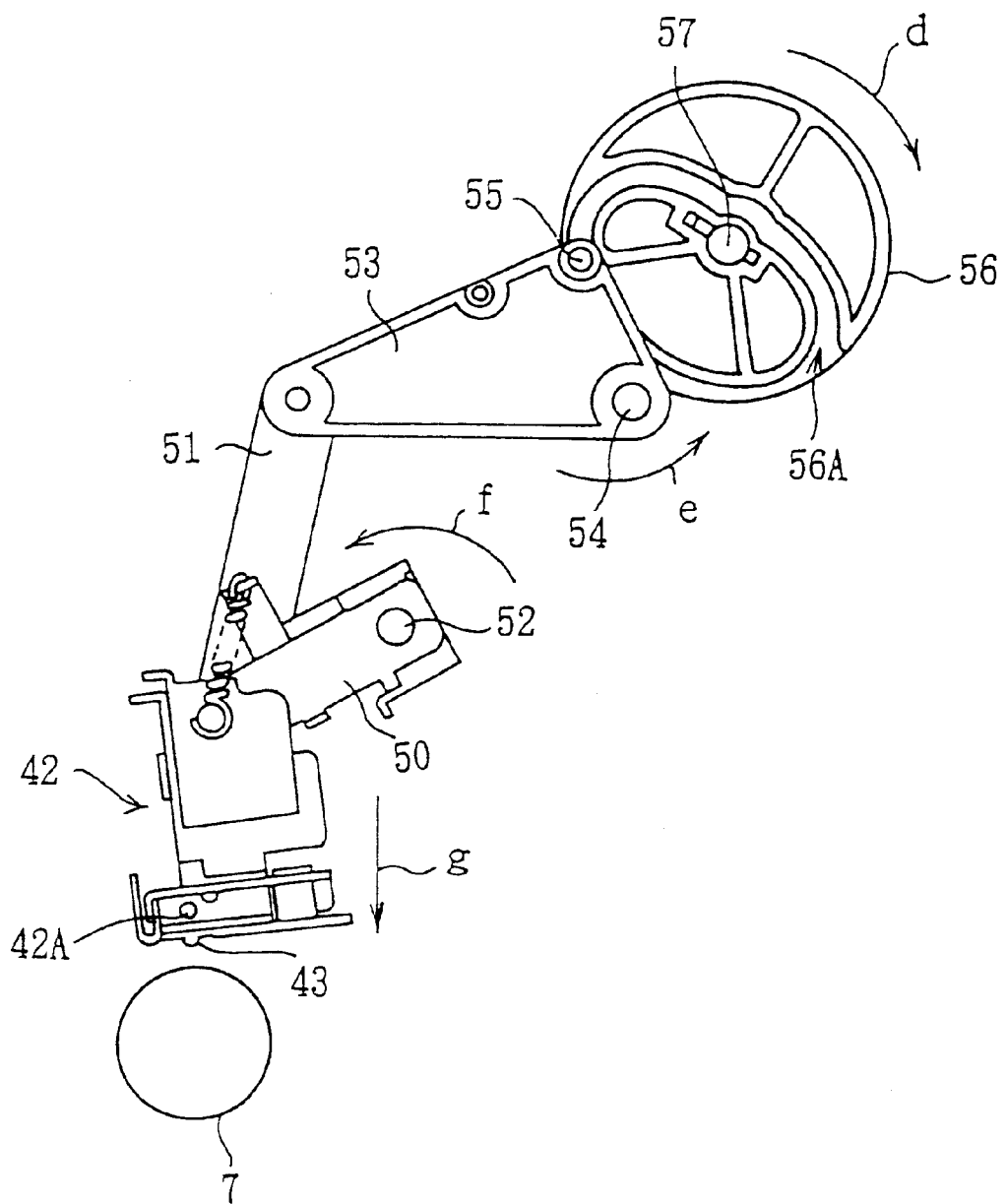
FIG. 3 is a schematic diagram illustrating an intermediate position of the head unit shown in FIG. 1.

Thus, the head unit 42 mounted to one end of the supporting member 50 for pivotal movements is moved during rotation of the supporting member 50, in a direction (indicated by an arrow g) in which the head unit 42 approaches the platen 7, and temporarily stops at a predetermined position near the platen 7 (hereinafter, this position is called the "intermediate position"), as illustrated in FIG. 3.

The ink ribbon 47 is thereby pressed against the thermally transferred head 43 of the head unit 42. At the intermediate position, the supply reel 45 and the wind-up reel 46 eliminate any sag of the ink ribbon 47 and feed the ink ribbon 47 to the head position for one page.

Figure 4:
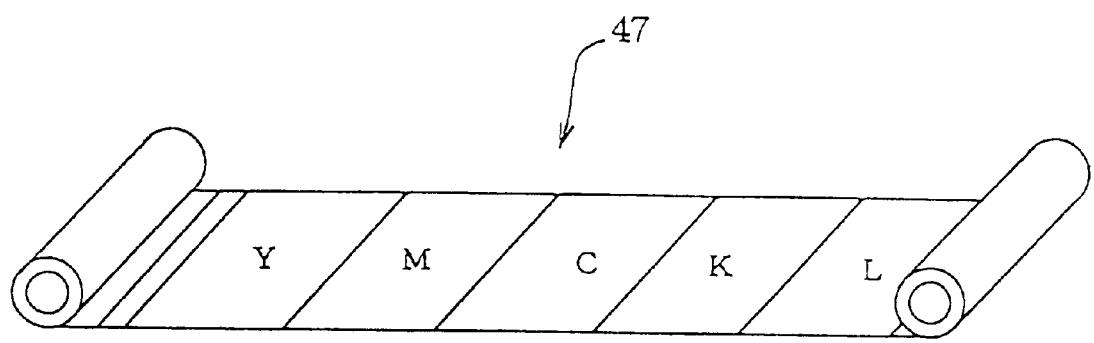
FIG. 4 is a schematic diagram illustrating an ink ribbon.

More specifically, the ink ribbon 47 includes color pigments of yellow Y, magenta M, cyan C and black K, each coated over a predetermined length on the ink ribbon 47 as a pigment for one magnetic IC card 4, followed by a film-like sheet L, as illustrated in FIG. 4. Further, a predetermined mark (not shown) is impressed at the head position for each page of the ink ribbon 47 such that the head position of the ink ribbon 47 can be located by detecting the mark by an optical sensor (not shown) disposed on a running path of the ink ribbon 47.

Figure 5:
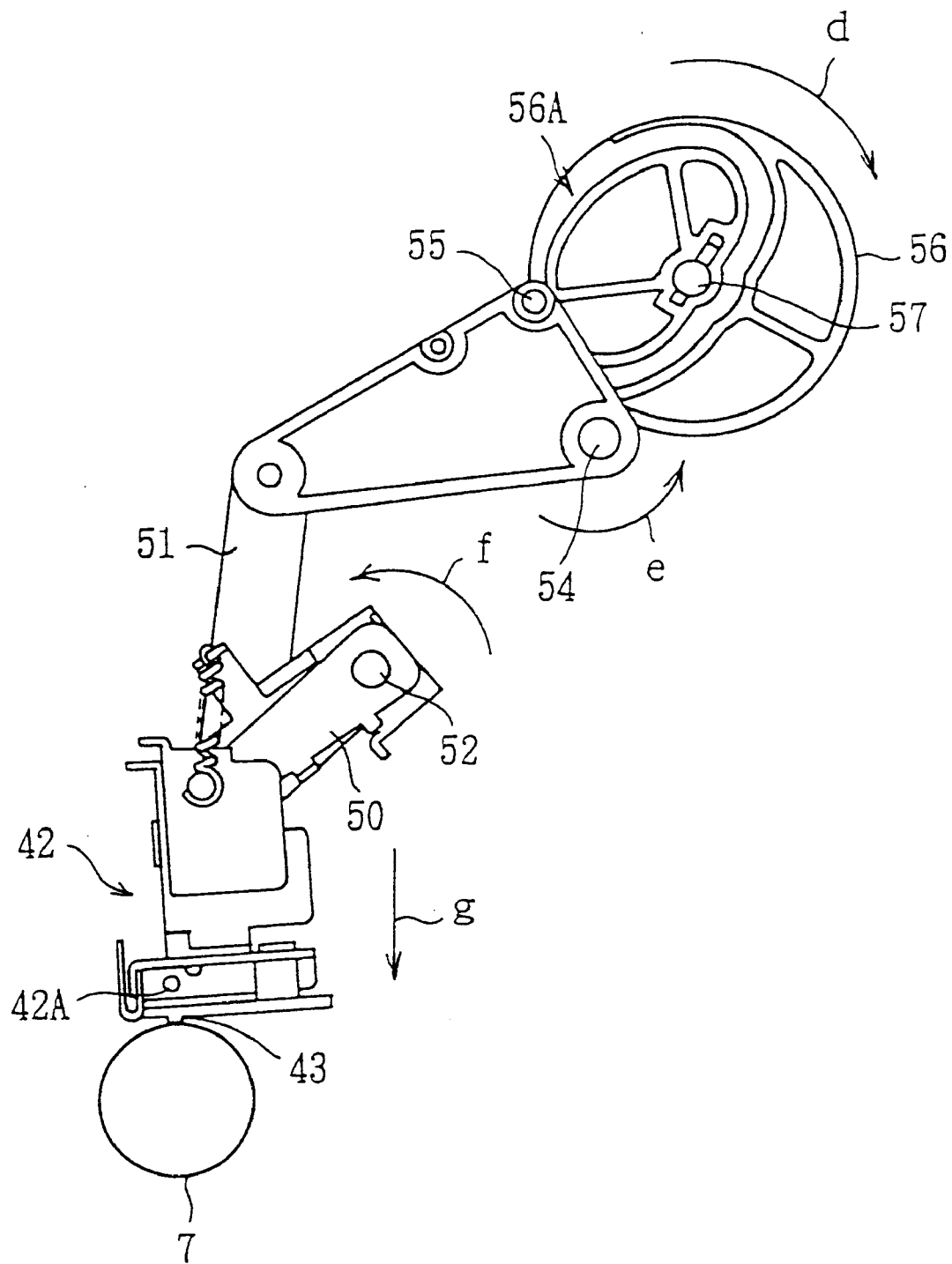
FIG. 5 is a schematic diagram illustrating a printing position of the head unit shown in FIG. 1.

Subsequently, the color image printing unit 40 rotates the disk cam 56 in the direction indicated by the arrow d in response to the driven head motor. When the pin 55 sliding along the cam groove 56A of the disk cam 56 reaches the position furthest away from the cam shaft within the cam groove 56A, the color image printing unit 40 stops driving the head motor. At this time, the head unit 42 is lowered from the intermediate position in a direction indicated by arrow g to a predetermined position at which it is pressed against the platen 7 (hereinafter, this position is called the "image printing position"), as illustrated in FIG. 5.

In this state, the card transport unit 5 rotates the platen 7 to feed the magnetic IC card 4 in the direction indicated by the arrow a along the transport path CR. The color image printing unit 40 in turn presses the thermal transfer head 43 against the opposing surface of the magnetic IC card 4 over the entire width thereof in synchronism with the rotation of the platen 7, and simultaneously thermally transfers the pigment of yellow Y over the entire surface based on predetermined image printing data, thereby printing regions corresponding to yellow Y as a desired color image.

Subsequently, when the optical sensor 15 disposed in front of the second transport section 5B detects that the magnetic IC card 4 has passed, the color image printing unit 40 drives the head motor to rotate the head driving shaft 57 in the direction opposite to the direction indicated by the arrow d, thereby moving the head unit 42 now at the image printing position back to the intermediate position.

Then, the card transport unit 5 rotates the upper transport rollers 8A to 11A to send the magnetic IC card 4 back along the transport path CR in the direction opposite to the direction indicated by the arrow a. As the optical sensor 14 disposed behind the first transport section 5A detects that the magnetic IC card 4 has passed, the card transport unit 5 stops rotating the upper rollers 8A to 11A. As a result, the magnetic IC card 4 has its head again aligned to the color image printing unit 40.

Subsequently, the color image printing unit 40 rotates the supply reel 45 and the wind-up roll 46 to run the ink ribbon 47 by a predetermined length to align the pigment of magenta M to the head unit 42, and then drives the head motor to lower the head unit 42 from the intermediate position to the image printing position.

In this state, the color image printing unit 40 forces the thermal transfer head 43 to thermally transfer the pigment of magenta M over the opposing surface of the magnetic IC card 4 in a manner synchronized with the rotation of platen 7 to feed the magnetic IC card 4 along the transport path CR, thereby printing regions corresponding to magenta M within the desired color image.

Next, the card transfer unit 5 and the color image printing unit 40 sequentially repeat similar image printing operations to the above to print regions corresponding to cyan C and black K within the desired color image over the surface of the magnetic IC card 4, and finally transfer the film-like sheet L over the entire surface of the magnetic IC card 4, on which the desired color image has been printed, to laminate the entire surface of the magnetic IC card 4.

The magnetic IC card 4, with the desired color image printed on the surface, is fed from the card transfer unit 5 to the rotary transfer unit 6 along the transfer path CR. In this event, the rotary mechanism 20 has been aligned to the transport reference position in the rotary transfer unit 6, and rotates the first and second flipper rollers 22A, 23A on the lower side to sandwich the magnetic IC card 4 between the first pair of flipper rollers 22A, 22B and between the second pair of flipper rollers 23A, 23B.

In this state, the rotary transfer unit 6 rotates the rotary mechanism 20, now at the transfer reference position, in the direction opposite to the direction indicated by the arrow r by an angular distance of 180 degrees, to align the magnetic IC card 4 to a position corresponding to the second transport section 5B of the card transport unit 5 (hereinafter, this position is called the "reverse transport reference position").

Subsequently, the rotary transport unit 6 rotates the first and second flipper rollers 22A, 23A on the lower side to move the magnetic IC card 4 in the direction opposite to the direction indicated by the arrow a to feed the same to the card transport unit 5. Then, the card transport unit 5 and the color image printing unit 40 can print a color image over the other surface of the magnetic IC card 4 based on predetermined image printing data by executing similar image printing processing to that described above, which has been previously executed to print the desired color image over the surface of the magnetic IC card 4.

The magnetic IC card 4, which has the desired color images printed respectively on both sides, is fed from the card transport unit 5 to the rotary transport unit 6 along the transport path CR. In this event, the rotary transport unit 6 rotates the first and second flipper rollers 22A, 23A on the lower side of the rotary mechanism 20, now at the reverse transport reference position, to move the magnetic IC card 4 in the direction indicted by the arrow a to feed the same to a card tray (not shown) arranged externally through a card discharge port 2B on the end surface of the housing 2 opposite to the end surface on which the card insert port 2A is formed.

In the card printer 1, the card transfer unit 5, rotary transfer unit 6, magnetic recording/reproducing unit (not shown), IC recording/reproducing unit 30 and color image printing unit 40 are respectively driven in predetermined states under the control of a host computer (not shown) which serves as a control means.

(2) Printing in Color Image Printing Unit

Figure 6:
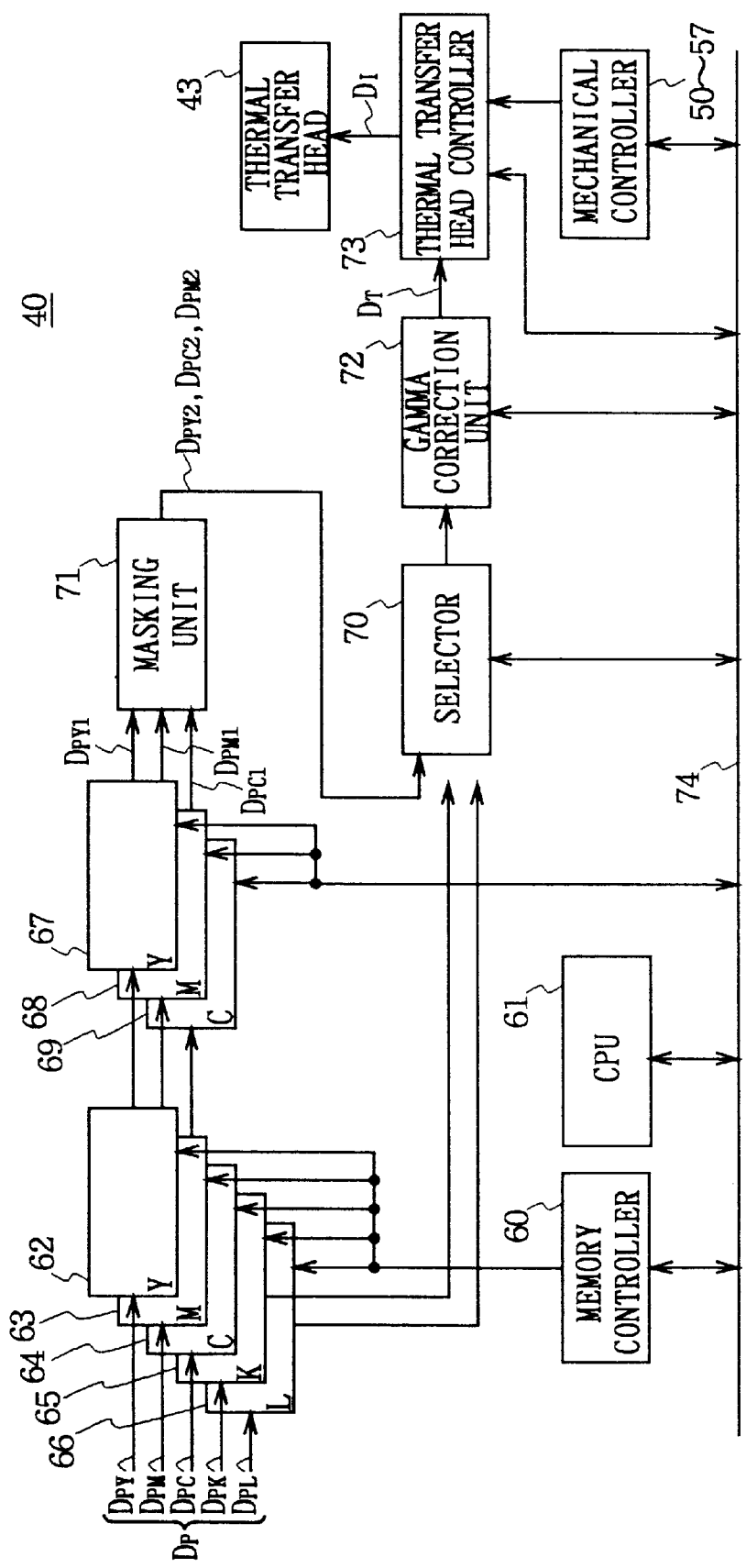
FIG. 6 is a block diagram illustrating the configuration of a color image printing unit.

FIG. 6 illustrates the circuit configuration of the color image printing unit 40. As predetermined image printing data DP is supplied from a host computer (not shown) to the color image printing unit 40, a memory controller 60 writes a one-frame portion of the image printing data DP into corresponding frame memories 62 to 66 as color image printing data DPY (yellow Y), DPM (magenta M), DPC (cyan C) and DPK (black K), corresponding to the respective colors, and laminate data PDL (film-like sheet L) in accordance with the control of a CPU 61.

Next, the memory controller 60 reads the color image printing data DPY, DPM, DPC, DPK and the laminate data DPL from the respective frame memories 62 to 66 according to timing predetermined in accordance with the control of the CPU 61, and then feeds the color image printing data DPY, DPM, DPC to color adjustment units 67 to 69, respectively, and feeds the color image printing data DPK and the laminate data DPL to respective input terminals of a selector 70.

The color adjustment units 67 to 69, which are provided with a color conversion table (not shown) having standard image printing characteristics for each color, perform a color adjustment for each color in accordance with an adjustment curve before and after color matching processing, and feeds resulting color image printing data DPY1, DPM1, DPC1 to a masking unit 71.

The masking unit 71 separates unnecessary data from the supplied color image printing data DPY1, DPM1, DPC1 and feeds resulting color image printing data DPY2, DPM2, DPC2 to other input terminals of the selector 70.

The selector 70 sequentially feeds a gamma correction unit 72 with data selected as required from the respective color image printing data DPY2, DPM2, DPC, DPK and the laminate data DPL, supplied thereto, based on the control of the CPU 61. The gamma correction unit 72 performs a concentration-conduction time conversion with a predetermined heat correction coefficient, set in a manner controlled by CPU 61, and supplies a thermal transfer head controller 73 with print image data DT resulting from the conversion.

The thermal transfer head controller 73, which is disposed in the head unit 42, converts the print image data DT to a current signal DI which is then provided to the thermal transfer head 43. As a result, a plurality of heat generating resistors arranged on a head surface (not shown) of the thermal transfer head 43 are heated in accordance with the current signal DI. Consequently, the color image printing unit 40 can heat the head surface of the thermal transfer head 43 based on the image printing data DP, thereby printing a desired color image in accordance with the image print data DP based on the heated head on one or the other side (or both sides) of the magnetic IC card 4.

The CPU 61 can move the thermal transfer controller 73 in the head unit 42 closer to or away from the platen 7 by controlling the driving of mechanical controllers 50 to 57. The CPU 61 also sends control instructions to respective circuits through a bus 74.

(3) Structure of Rotary Transport Unit

Figure 7:
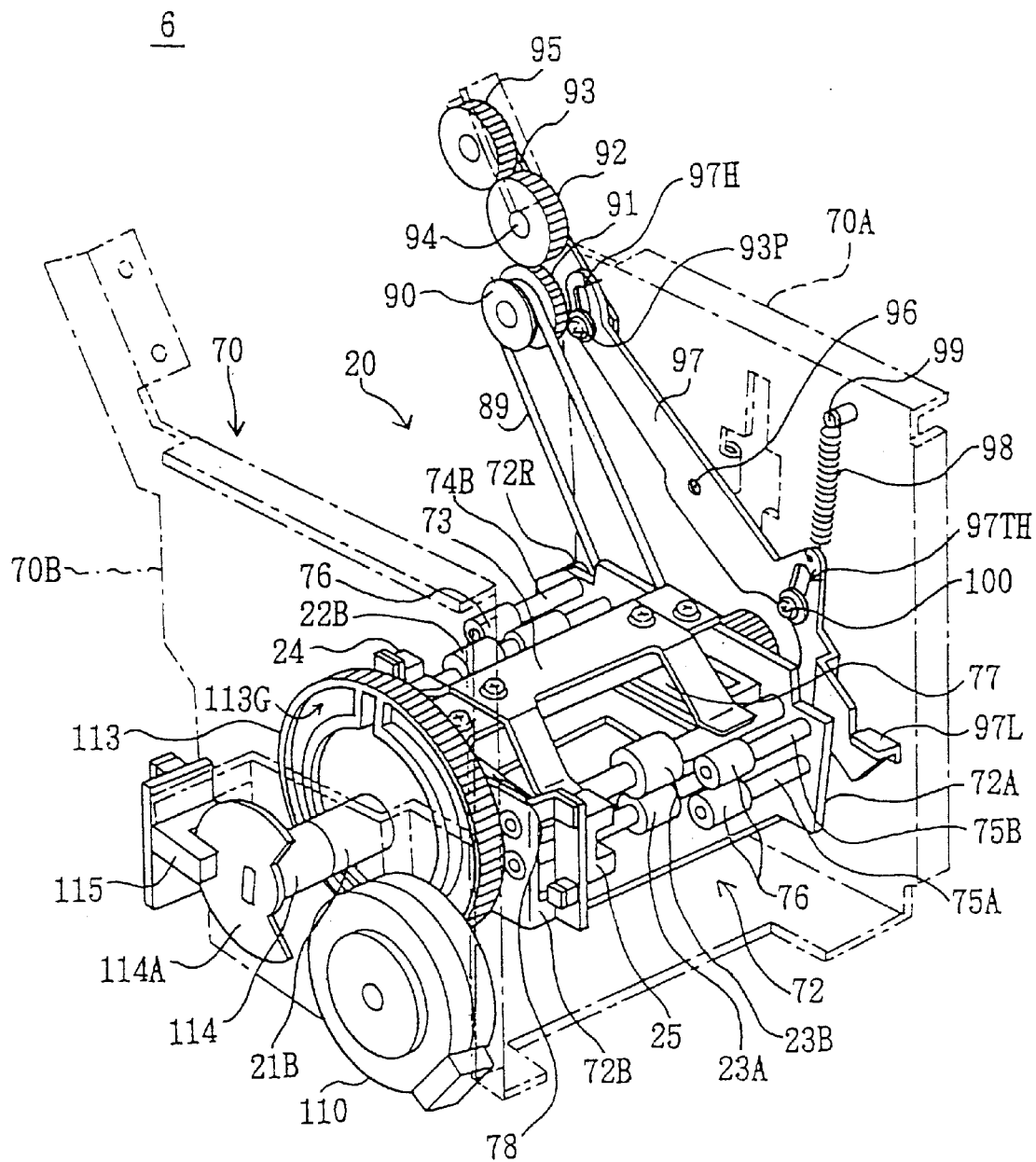
FIG. 7 is a perspective view illustrating the structure of a rotary transport unit.

As illustrated in FIG. 7, where parts corresponding to those in FIG. 1 are designated with the same reference numerals, the rotary transport unit 6 has coaxial rotating shafts 21A, 21B pivotally attached to respective side plates 70A, 70B of a supporting plate 70 having a substantially U-shaped cross-section. The rotary mechanism 20 is mounted between the rotating shafts 21A, 21B to rotate integrally with the respective rotating shafts 21A, 21B.

In the rotary mechanism 20, a frame body 72 having side frames 72A, 72B opposite to the side plates 70A, 70B of the supporting plate 70 is secured to the rotating shafts 21A, 21B, and the first pair of flipper rollers 22A, 22B and the second pair of flipper rollers 23A, 23B are rotatably mounted on associated shafts between the side frames 72A and 72B.

The first and second flipper rollers 22A, 23A on the lower side is supported for rotation to the accompaniment with the rotation of a transport motor (not shown) implemented by a stepping motor. The first and second flipper rollers 22B, 23B on the upper side is supported rotatably and slightly slidably in a direction closer to or away from the corresponding first and second flipper rollers 22A, 23A on the lower side. Also, the first and second flipper rollers 22B, 23B are urged by a pressing member 73 mounted on one surface of the frame body 72 so as to remain in contact with the first and second flipper rollers 22A, 23A on the lower side.

With the structure described above, when the magnetic IC card 4 is inserted between the first pair of flipper rollers 22A, 22B and/or between the second pair of flipper rollers 23A, 23B, the first and second flipper rollers 22B, 23B on the upper side are always pressing the magnetic IC card 4 which is therefore sandwiched between the first pair of flipper rollers 22A, 22B and/or between the second pair of filler rollers 23A, 23B.

Also, rods 74A, 74B and rods 75A, 75B are formed in parallel with the rotating shafts 21A, 21B, protruding from the inner surface of the side frame 72A of the frame body 72, corresponding to the first pair of flipper rollers 22A, 22B and the second pair of flipper rollers 23A, 23B. A roller 76 is rotatably mounted at a leading end of each of the rods 74A, 74B and the rods 75A, 75B for serving as a guide for the magnetic IC card 4 when it is passed between the first pair of flipper rollers 22A, 22B and/or between the second pair of flipper rollers 23A, 23B.

The optical sensors 24, 25 are secured on the inner surface of the side frame 72B of the frame body 72 for detecting the presence or absence of the magnetic IC card 4 which may pass between the first pair of flipper rollers 22A, 22B and/or between the second pair of flipper rollers 23A, 23B.

Further, on inner opposing surfaces of the respective side frames 72A, 72B of the frame body 72, guide members 77, 78, having a substantially inverted C-shaped cross-section, are disposed protruding in the axial direction of the rotating shafts 21A, 21B, such that the magnetic IC card 4 sandwiched between a pair of flipper rollers 22A, 22B (23A and 23B) is guided by the guide members 77, 78 to the other pair of flipper rollers 23A, 23B (22A, 22B).

Figure 8:
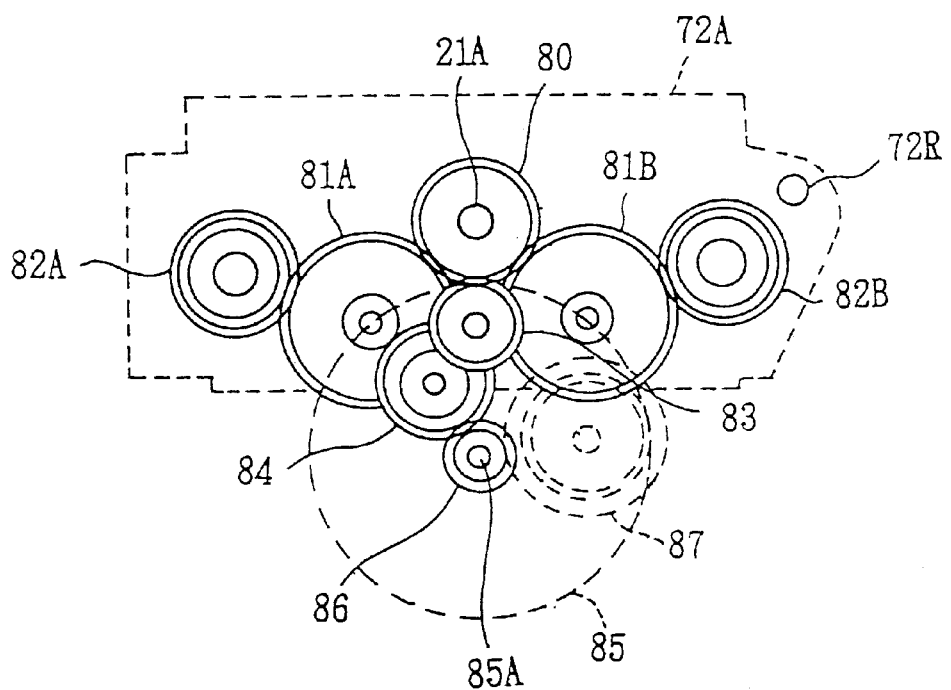
FIG. 8 is a schematic diagram used for explaining an engaged state of a transport motor.

Now, FIG. 8 illustrates a partial perspective view of the rotary transport unit 6 viewed from the outer surface of the side plate 70A of the supporting plate 70. On the side frame 72A of the frame body 72 in the rotary mechanism 20, gears 82A, 82B secured to the first and second flipper rollers 22A, 23A on the lower side are meshed through a gear 81A and a gear 81B, respectively, to a gear 80 rotatably mounted on the rotating shaft 21A.

On the side plate 70A of the supporting plate 70, a gear 86 secured to an output shaft 85A of a transport motor 85 is meshed sequentially through a gear 83 and a gear 84 to the gear 80 rotatably mounted on the rotating shaft 21A.

With the structure described above, when the transport motor 85 is driven, the gear 80 engaged between the supporting plate 70 and the frame body 72 of the rotary mechanism 20 is rotated to the accompaniment with the rotating output shaft 85A of the transport motor 85, causing rotations through the gear 80 of the first and second flipper rollers 22A, 23A on the lower side disposed in the rotary mechanism 20.

Figure 9:
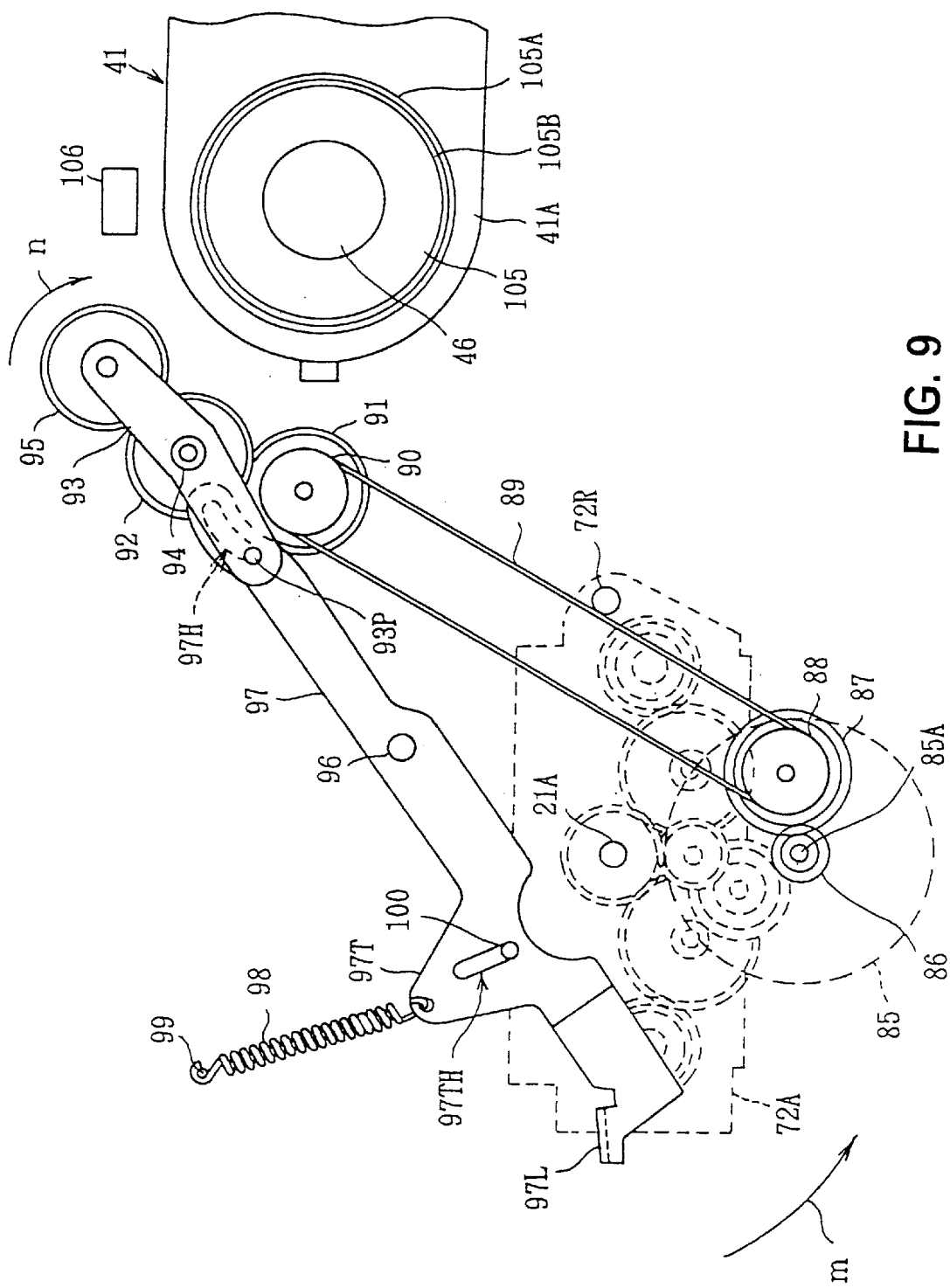
FIG. 9 is a schematic diagram used for explaining how a ribbon cassette is engaged.

Next, in FIG. 9, a gear 87 is meshed with a gear 86 secured to the output shaft 85A of the transport motor 85 on the side plate 70A of the supporting plate 70, and a belt 89 is wrapped at one side around a belt wheel 88 integrally fitted in the gear 87 on the driving side. A belt wheel 90 on the driven side, wound by the belt 89 on the other side, is rotatably mounted on the side plate 70A at a predetermined position, and a gear 91 integrally fitted on the belt wheel 90 is meshed with an adjacent gear 92.

The gear 92 is rotatably mounted on a fixed shaft 94 on the side plate 70A together with a central portion of a rotating rod 93, and meshed with a gear 95 rotatably mounted to one end of the rotating rod 93. Thus, as the transport motor 85 is driven, the gear 87 is rotated to the accompaniment with the rotating output shaft 85A of the transport motor 85, thereby causing the gear 95 to rotate through the belt 89.

At a predetermined position of the side plate 70A, an engaging member 97 having a guide hole 97H of a predetermined shape pierced at one end and an abutting lever 97L at the other end is mounted for rotation about a supporting shaft 96. Further, at a predetermined position on the engaging member 97 between the supporting shaft 96 and the abutting lever 97L, a protrusion 97T in substantially a triangular shape is protrusively formed with one end of a coil spring 98 fixed to a leading end thereof. Also, a guide hole 97TH is pierced in a predetermined shape in a central portion of the protrusion 97T.

A pin 93P is protrusively formed at the other end of the rotating rod 93, and engaged slidably along the guide hole 97H pierced at one end of the engaging member 97. At predetermined positions on the side plate 70A, fixed pins 99, 100 are disposed respectively, where the other end of the coil spring 98 is attached to the fixed pin 99, while the other pin 100 is slidably engaged with the guide hole 97TH of the engaging member 97.

Further, in the rotary mechanism 20, an abutting roller 72R is rotatably formed protruding on an outer end portion of the side frame 72A of the frame body 72. As the rotary transport unit 6 rotates the rotary mechanism 20 about the rotating shafts 21A, 21B in a direction indicated by an arrow m, the abutting roller 72R rotating integrally with the rotary mechanism 20 abuts to and presses against the abutting lever 97L of the engaging member 97, thereby causing the engaging member 97 to rotate about the supporting shaft 96 within a range in which the fixed pin 100 slides over the guide hole 97TH, and causing the rotating rod 93 to rotate about the fixed shaft 94 in a direction indicated by an arrow n within a range in which the pin 93P slides over the guide hole 97H.

In this way, the rotary transport unit 6 rotates the rotary mechanism 20 about the rotating shafts 21A, 21B in the direction indicated by the arrow m as required, thereby permitting the gear 95 mounted at the predetermined position on the side plate 70A to rotate in the direction indicted by the arrow n by a predetermined angular distance.

In the card printer 1 of this embodiment, when the ribbon cassette 41 is loaded at a predetermined position between the color image printing unit 40 and the platen 7, the gear 95 mounted at the predetermined position of the side plate 70A is engaged with the ribbon cassette 41 as required.

Figure 11:
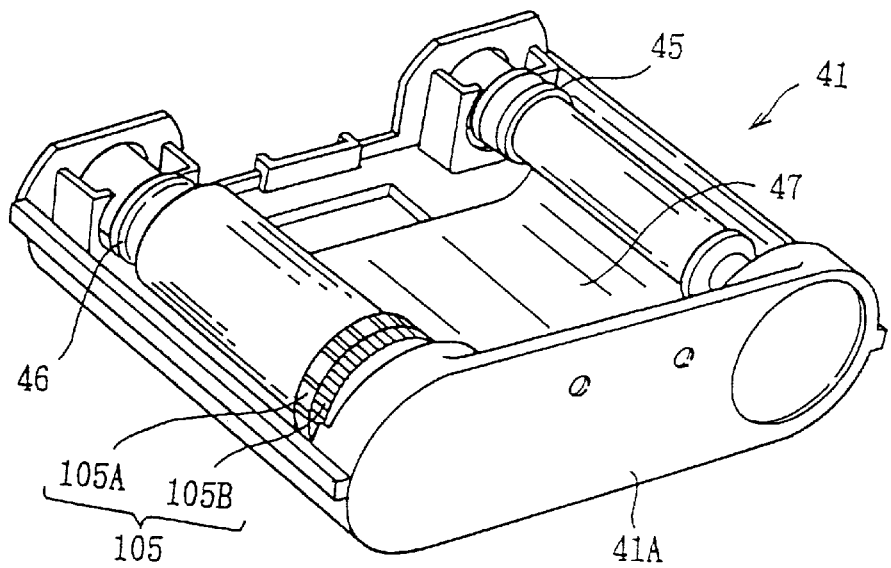
FIG. 11 is a perspective view illustrating the structure of the ribbon cassette.

As illustrated in FIG. 11, the ribbon cassette 41 has a supply reel 45 and a wind-up reel 46 rotatably supported in a cassette body 41A, and has a ribbon code ring 105 rotatably mounted on one end side of the wind-up reel 46. The ribbon code ring 105 is composed of a reflective code 105A having a predetermined pattern and a gear 105B having a predetermined number of teeth, which are integrally formed in parallel with each other. The reflective code 105A has a different formation pattern according to the type of the ribbon cassette 41 such that an optical sensor 106 disposed near the ribbon code ring 105 detects the reflective code 105A to determine the type of the ribbon cassette 41 (i.e., the type of the ink ribbon 47) currently loaded in the card printer 1.

Figure 10:
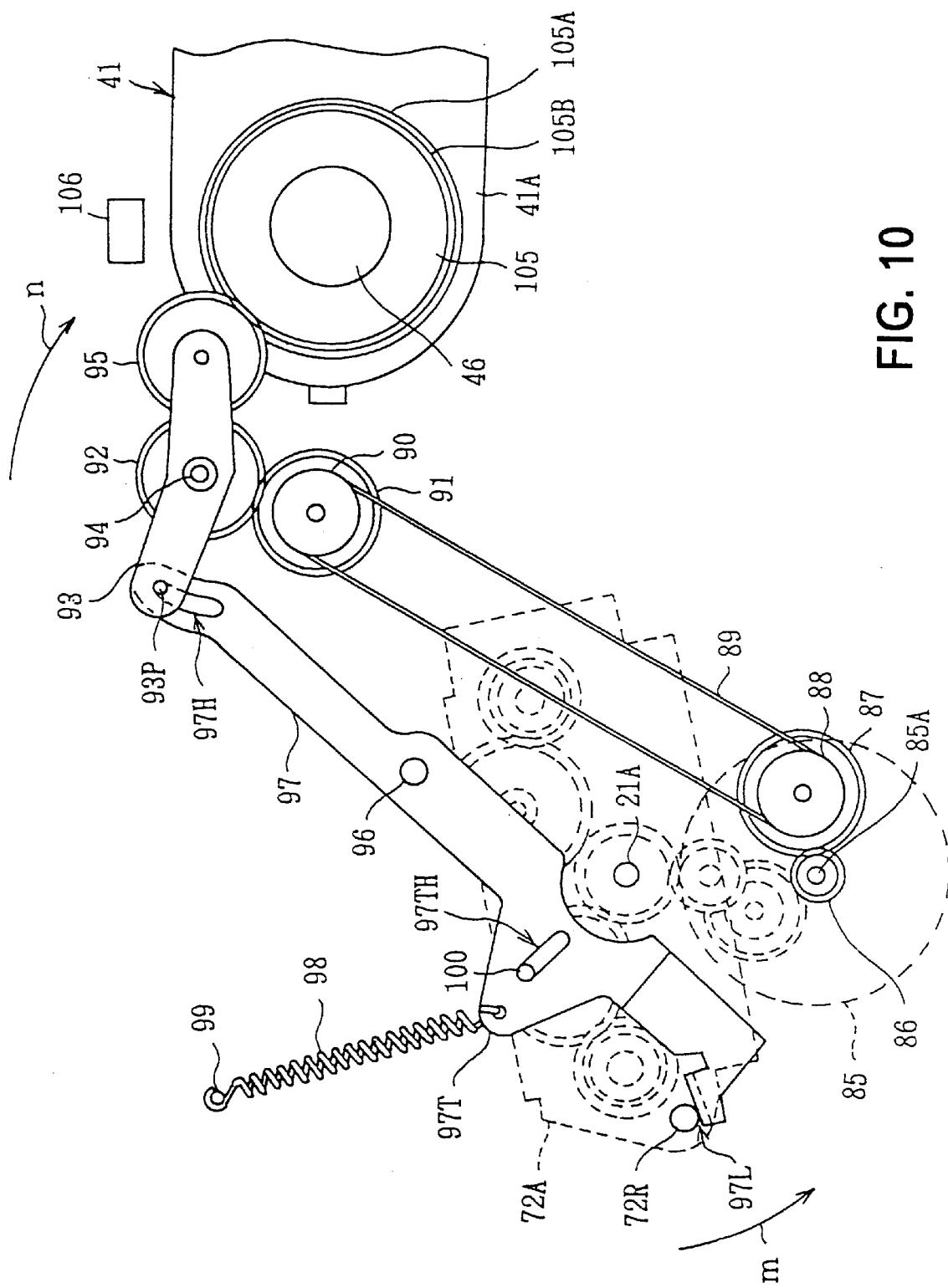
FIG. 10 is a schematic diagram used for explaining how the ribbon cassette is engaged.

In this event, the ribbon code ring 105 must be rotated for the optical sensor 106 to read the reflective code 105A formed on the ribbon code ring 105. For this purpose, the gear 95 mounted at the predetermined position on the side plate 70A is meshed with the gear 105B of the ribbon code ring 105 to the accompaniment with the rotation of the rotary mechanism 20, as illustrated in FIG. 10, to enable the ribbon code ring 105 to rotate in response to the driven transport motor 85.

For discriminating the type of the ribbon cassette 41 loaded in the card printer 1, the gear 95 is engaged with the ribbon cassette 41 only while the rotary transport unit 6 is being driven, as described above, thereby preventing the ribbon cassette 41 from being removed from the card printer 1 when the ribbon code ring 105 is being engaged.

Figure 12:
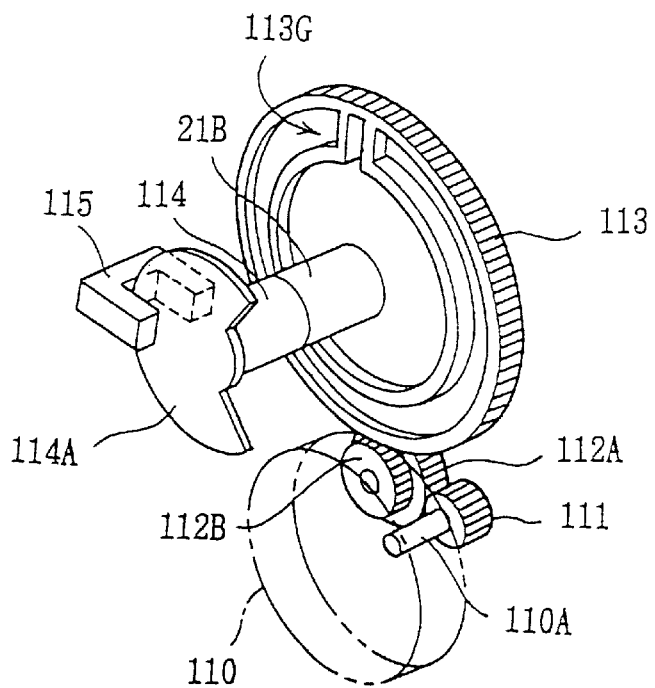
FIG. 12 is a schematic diagram used for explaining how a rotating motor is engaged.

Referring next to FIG. 12, on the side plate 70B of the supporting plate 70, a gear 111 secured to an output shaft 110A of the rotating motor 110 implemented by a stepping motor is meshed with a gear 112A, and a gear 112B fitted on the gear 112A is meshed with a gear 113 as a stopper. On the central axis of the gear 113, a rotating shaft 21B is fitted, and a rotating shield 114 is also fitted through the side plate 70A, whereby the rotating shaft 21B and the rotating shield 114 are rotated integrally with the gear 113.

A guide groove 113G of substantially a C-shape having a predetermined width is formed in the surface of the gear 113 opposite to the rotating shield 114 along the circumference of the gear 113. A protrusion (not shown) formed on the inner surface of the side plate 70B of the supporting plate 70 is fitted in the guide groove 113G, thereby allowing the gear 113 to rotate within a range in which the protrusion comes in contact with one or the other end of the guide grove 113G.

In this way, when the rotating motor 110 is driven, the gear 113 is rotated to the accompaniment with the rotation of the output shaft 110A of the rotating motor 110 together with the rotating shaft 21B and the rotating shield 114, thereby causing the rotary mechanism 20 fixed to the rotating shaft 21B to rotate together with these components.

Thus, the guide groove 113G formed in one side of the gear 113 as a stopper for the supporting plate 70 prevents the rotary mechanism 20 from rotating over 360 degrees or more only in one direction to consequently prevent wires drawn from the optical sensors 24, 25 (see FIG. 7) in the rotary mechanism 20 from being wound around the rotating shaft 21B or the like.

The rotating shield 114 is also formed at one end thereof with a sector shield plate 114A perpendicular to the rotating shaft 21B, and an optical sensor 115 having substantially a C-shape straddles the shield plate 114A. Thus, the rotating shield 114 can be rotated about the rotating shaft 21B within a range in which the optical sensor 115 detects the shield plate 114A. It is therefore possible to readily locate reference positions for the rotary mechanism 20, i.e., a rotation start position and a rotation end position.

In the rotary transport unit 6 constructed as described above, the rotary mechanism 20 is rotated in response to the driven rotating motor 110, and the first and second flipper rollers 22A, 23A on the lower side are rotated in response to the driven transport motor 85. While the rotating motor 110 is being driven, the gear 80 rotatably mounted on the rotating shaft 21A of the rotary mechanism 20 remains fixed, so that the gear 81A and the gear 81B meshed with the gear 80 are rotated along with rotary mechanism 20.

As a result, the gears 82A, 82B respectively meshed with the gears 81A, 81B are also rotated to rotate the first and second flipper rollers 22A, 23A on the lower side, meshed with the gears 82A, 82B, respectively, causing a magnetic IC card 4 to be ejected in one direction when it is sandwiched between the first pair of flipper rollers 22A, 22B and/or between the second pair of filler rollers 23A, 23B in the rotary mechanism 20.

Therefore, in the rotary mechanism 20, the optical sensors 24, 25 detect whether or not the magnetic IC card 4 is sandwiched between the first pair of flipper rollers 22A, 22B or between the second pair of flipper rollers 23A, 23B, and the optical sensor 115 detects the initial position of the rotary mechanism 20 with respect to the supporting plate 70.

Subsequently, when the rotary mechanism 20 has been rotated about the rotating shafts 21A, 21B by a predetermined angular distance, the rotary transport unit 6 detects the number of pulses corresponding to a rotating angle of the rotating motor 110, and then calculates the number of pulses corresponding to a rotating angle of the transport motor 85 at this time with reference to the gear 80 such that a deceleration ratio provided by the gears (rotation driving system) 111, 112A, 112B, 113 engaged with the rotating motor 110 matches a deceleration ratio provided by the gears (transport system) 86, 84, 83 engaged with the transport motor 85.

As a result, by driving the transport motor 85 to rotate backwardly by an angular distance corresponding to the calculated number of pulses, the magnetic IC card 4 is returned to the original proper position by the action of the rotating first and second flipper rollers 22A, 23A on the lower side. Further, even when a gear train engaged with the transport motor 85 is moved in association with the driven rotating motor 110 in the rotary transport unit 6, the amount of rotation of the rotary mechanism 20 is always detected to drive the transport motor 85 in accordance with the result of the detection, so that the transport motor 85 can be rotated to return the associated gear train to an original state, thereby making it possible to always maintain the magnetic IC card 4 sandwiched in the rotary mechanism 20 at a predetermined position.

(4) Operation of a Preferred Embodiment

Figure 13:
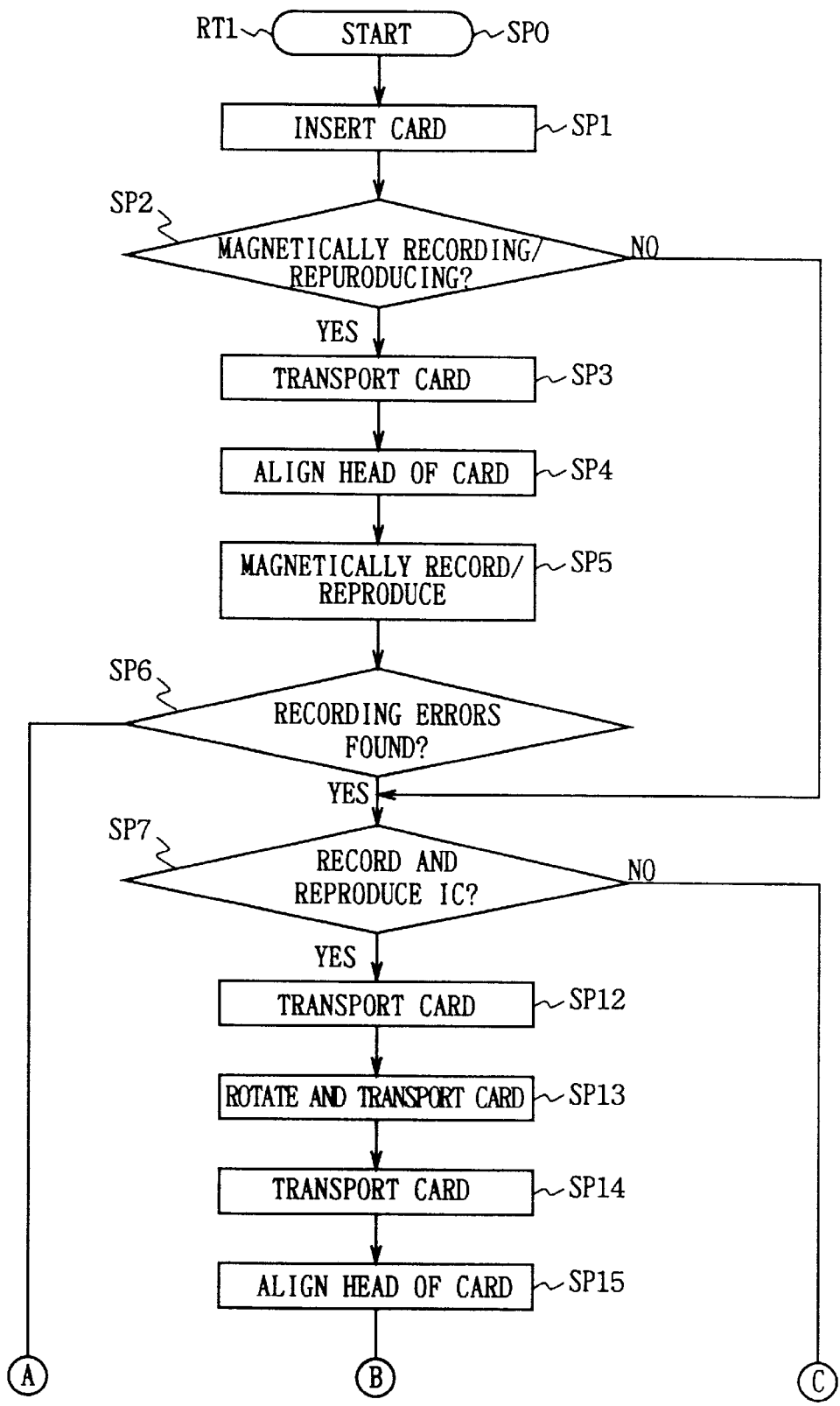
FIG. 13 is a flow chart used for explaining an image printing processing procedure.
Figure 14:
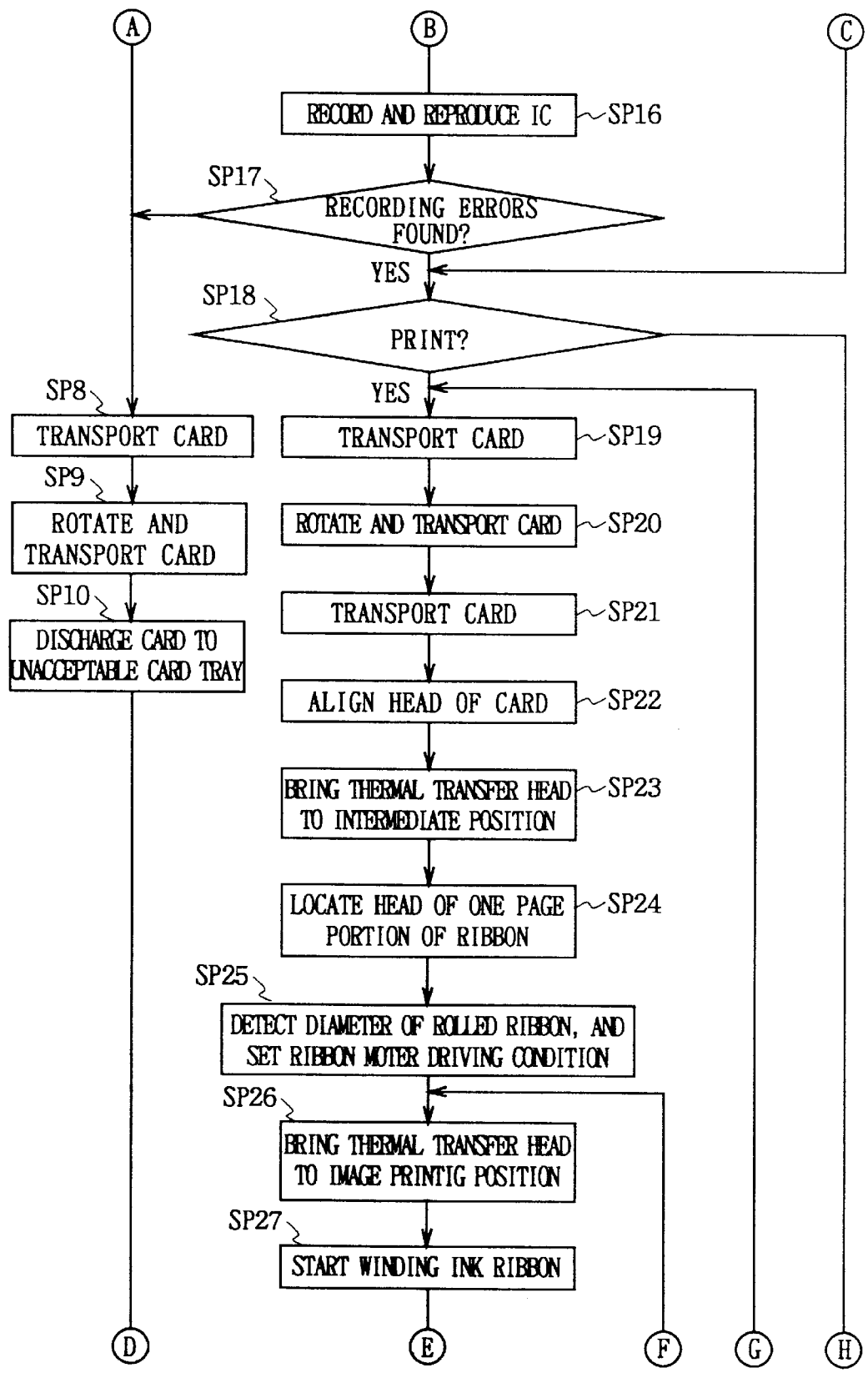
FIG. 14 is a flow chart used for explaining an image printing processing procedure.
Figure 15:
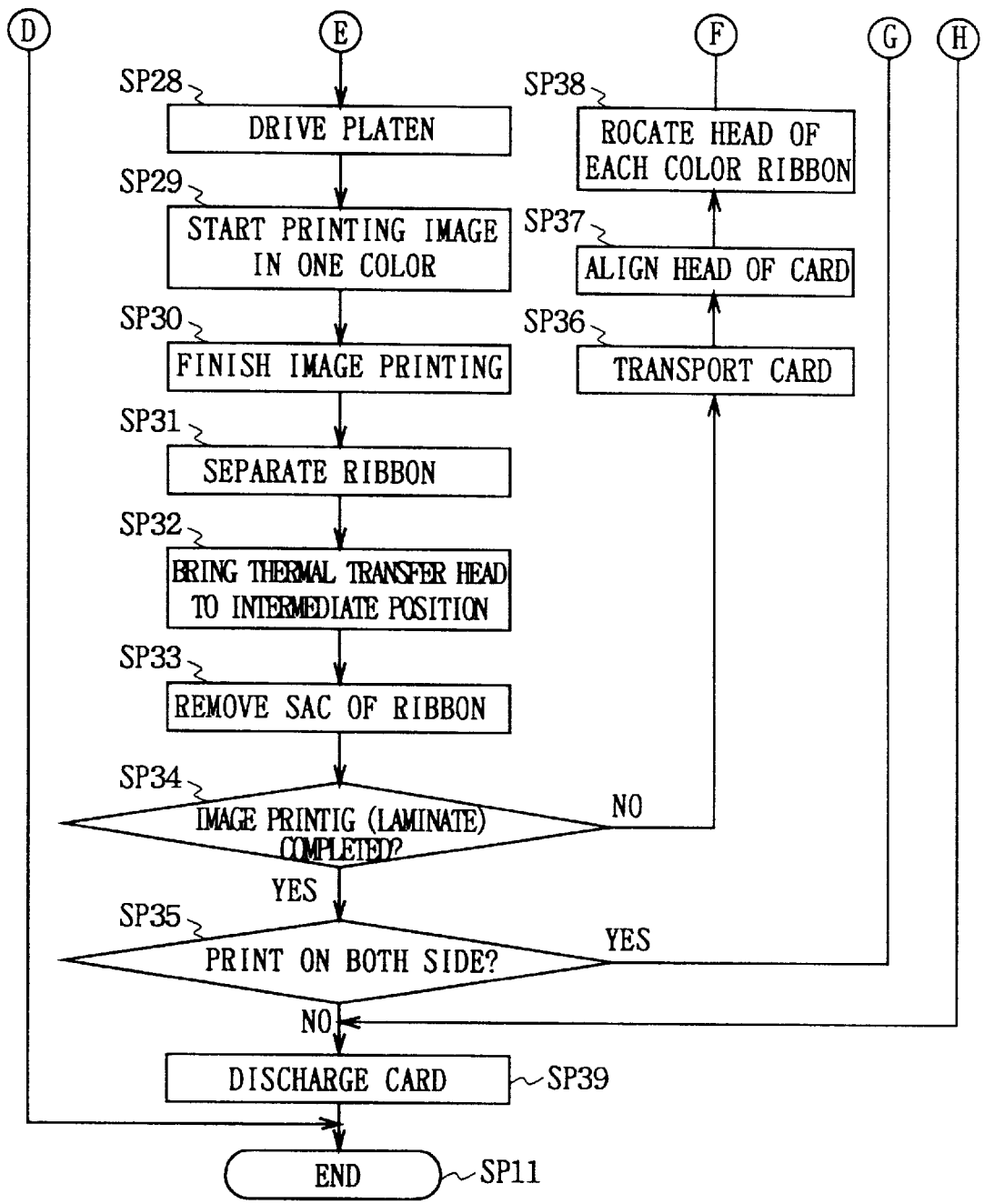
FIG. 15 is a flow chart used for explaining an image printing processing procedure.

With the configuration described above, an image printing processing procedure RT1 illustrated in FIGS. 13 to 15 is executed to force the color printer 1 to record predetermined information as required on a magnetic stripe and in an IC memory formed on one side and on the other side of the magnetic IC card 4 conforming to the ISO standard, and to print a desired color image(s) on one or two sides of the magnetic IC card 4.

First, as the card printer 1 is powered on, the image printing processing procedure RT1 illustrated in FIG. 13 starts with step SP0, and a magnetic IC card 4 is inserted into the card insert port 2A on the end surface of the housing 2 at subsequent step SP1. Then, it is determined at step SP2 whether or not predetermined information is to be magnetically recorded on a magnetic stripe formed on one side of the magnetic IC card 4. If an affirmative result is returned at step SP2, the card printer 1 transports the magnetic IC card 4 through the first transport section 5A at step SP3, and aligns the head of the magnetic IC card 4 to the magnetic recording/reproducing unit (not shown) at step SP4.

Subsequently, the card printer 1 controls the magnetic recording/reproducing unit at step SP5 to record the predetermined information on the magnetic stripe on the magnetic IC card 4, and reproduces the recorded information. Then, the card printer 1 proceeds to step SP6 to determine whether or not any recording errors are found in the magnetic IC card 4, and proceeds to step SP7 only when an affirmative result is returned.

Conversely, if a negative result is returned at step SP2, the card printer 1 proceeds to step SP7 with no intermediate steps.

If a negative result is returned at step SP6, this means that the magnetic IC card 4 is unacceptable, in which case the card printer 1 proceeds to step SP8 (see FIG. 14) to transport the unacceptable magnetic IC card 4 to the rotary mechanism 20 through the second transport section 5B, and subsequently, at step SP9, the rotary mechanism 20 is rotated, with the unacceptable magnetic IC card 4 sandwiched therein, to align the card 4 to the unacceptable card discharge position. Then, the card printer 1 discharges the unacceptable magnetic IC card 4 sandwiched in the rotary mechanism 20 to the unacceptable card tray 26 at step SP10, followed by proceeding to step SP11 (see FIG. 15) to terminate the image printing processing procedure RT1.

At subsequent step SP7, the card printer 1 determines whether or not predetermined information is to be recorded in the IC memory provided on the other side of the magnetic IC card 4. If an affirmative result is returned at step SP7, the card printer 1 proceeds to step SP12, where the magnetic IC card 4 is transported to the rotary mechanism 20 through the second transport section 5B, and at subsequent step SP13, the rotary mechanism 20 is rotated to align the magnetic IC card 4, sandwiched therein, to the IC recording/reproducing position. Thereafter, the card printer 1 moves the magnetic IC card 4 sandwiched in the rotary mechanism 20 along the transport path CR at step SP14, and positions the magnetic IC card 4 such that its head is aligned to the IC recording/reproducing unit 30 at step SP15.

The card printer 1 proceeds to next step SP16 illustrated in FIG. 14, where the magnetic IC card 4 is inserted into the IC recording/reproducing unit 30 through the insert port 30A to record predetermined information in the IC memory, and the recorded information is reproduced. The card printer 1 then proceeds to step SP17 to determine whether or not any recording errors are found in the magnetic IC card 4, and proceeds to step SP18 only when an affirmative result is returned.

Conversely, if a negative result is returned at step SP7, the card printer 1 proceeds to step SP18 with no intermediate steps.

If a negative result is returned at step SP17, this means that the magnetic IC card 4 is unacceptable, in which case the card printer 1 proceeds to step SP8, where the magnetic IC card 4 is transported to the rotary mechanism 20 along the transport path CR. Then, at subsequent step SP9, the rotary mechanism 20 having the unacceptable magnetic IC card 4 sandwiched therein is rotated to align the magnetic IC card 4 to the unacceptable card discharge position. Subsequently, the card printer 1 discharges the unacceptable magnetic IC card 4 sandwiched in the rotary mechanism 20 to the unacceptable card tray 26 at step SP10, and then proceeds to step SP11 to terminate the image printing processing procedure RT1.

At subsequent step SP18, the card printer 1 determines whether or not an image is to be printed on one side of the magnetic IC card 4. If an affirmative result is returned at step SP18, the card printer 1 proceeds to step SP19, where the magnetic IC card 4 is transported to the rotary mechanism 20 along the transport path CR. Then, at subsequent step SP20, the rotary mechanism 20 with the magnetic IC card 4 sandwiched therein is rotated to align the magnetic IC card 4 to the transport reference position. Thereafter, the card printer 1 moves the magnetic IC card 4 sandwiched in the rotary mechanism 20 along the transport path CR sequentially through the second and first transport sections 5B, 5A at step SP21, and then proceeds to step SP22, where the magnetic IC card 4 is positioned to align the head thereof to the color image printing unit 40.

Proceeding to next step SP23, the card printer 1 lowers the thermal transfer head 43 in the color image printing unit 40 to the intermediate position, and then at step SP24 locates the head of a one-page portion of the ink ribbon 47. Subsequently, at step SP25, the card printer 1 detects the diameter of the ink ribbon 47 wound around the supply reel, and sets a ribbon motor driving condition for controlling a winding state while applying a tension to the ink ribbon 47. Then, the card printer 1 lowers the thermal transfer head 43 to the image printing position at step SP26.

Subsequently, the card printer 1 starts winding the ink ribbon 47 at step SP27, and proceeds to step SP28 illustrated in FIG. 15, where the platen 7 is rotated. In this state, the card printer 1 starts printing an image in one color on the magnetic IC card 4 at step SP29, and finishes the image printing at step SP30. Then, the card printer 1 separates the ink ribbon 47 from the magnetic IC card 4 at step SP31, elevates the thermal transfer head 43 to the intermediate position at step SP32, and removes any sag in the ink ribbon 47 at step SP33.

Thereafter, the card printer 1 proceeds to step SP34 to determine whether or not the image printing (or lamination) is completed, and proceeds to step SP18 only when an affirmative result is returned.

If a negative result is returned at step SP34, the card printer 1 proceeds to step SP36, where the magnetic IC card 4 is moved along the transport path CR sequentially through the second and first transport sections 5B, 5A. Then, at step SP37, the magnetic IC card 4 is positioned such that its head is aligned to the color image printing unit 40.

Subsequently, the card printer 1 feeds the ink ribbon 47 to locate the head of the next color, different from the preceding color, to be printed at step SP38, followed by returning to step SP26 to repeat the processing up to step SP33 in a manner similar to that outlined above. Then, similar processing is repeated until an affirmative result is returned at step SP34.

Eventually, when an affirmative result is returned at step SP34, the card printer 1 proceeds to step SP35 to determine whether or not another image is to be printed on the other side of the magnetic IC card 4, now having an image printed on one side. If an affirmative result is returned at step SP35, the card printer 1 returns to step SP19 to repeat processing at steps SP19 to SP34 in a manner similar to the printing processing previously performed on one side of the magnetic IC card 4 as described above.

Conversely, if a negative result is returned at step SP35, the card printer 1 proceeds to step SP39 with no intermediate steps, whereby the magnetic IC card 4 is discharged from the card discharge port 2B formed on the end surface of the housing 2 through the rotary mechanism 20, followed by proceeding to step SP11 to terminate the image printing processing procedure RT1.

And similarly, if a negative result is returned at step SP18, the card printer 1 determines that no image will be printed on the magnetic IC card 4, and proceeds to step SP39, where the magnetic IC card 4 is discharged from the card discharge port 2B, followed by proceeding to step SP11 to terminate the image printing processing procedure RT1.

In the card printer 1 as described, by virtue of the rotary transport 6 rotatably disposed on the transport path CR for the magnetic IC card 4, a sequence of processing operations in the color image printing unit 40, magnetic recording/reproducing unit (not shown) and the IC recording/reproducing unit 30 can be performed through the rotary transport unit 6, instead of through a simple linear sequence of motions, such that the magnetic IC card 4 can be fed to the IC recording/reproducing unit 30 or to the card discharge port 2B. In addition, the magnetic IC card 4 can be returned back to the magnetic recording/reproducing unit or to the color image printing unit 40 through a switch back operation. In this way, the length of the transport path CR for the magnetic IC card 4 can be significantly reduced as compared with a linear transport path CR, resulting in a further reduction in the size of the entire card printer 1.

In addition, by virtue of the rotary transport unit 6 disposed at an output stage on the transport path CR, after it is determined whether or not any recording errors have occurred in the magnetic IC card 4 during the operations in the magnetic recording/reproducing unit or the IC recording/reproducing unit 30, the magnetic IC card 4 can be delivered as an acceptable product through the card discharge port 2B on the end surface of the housing 2 if no recording errors are found, and the magnetic IC card 4 can be discharged to the unacceptable card tray 26 as an unacceptable product if any recording errors are found.

Further, since the magnetic IC card 4 can be aligned to different discharge positions through the rotary transport unit 6 depending on whether it is acceptable or unacceptable, the card printer 1 can be internally provided with the unacceptable card tray 26 for discharging unacceptable magnetic IC cards 4 therein.

Further, by virtue of the rotary transport unit 6 being disposed behind the magnetic recording/reproducing unit, a color image can be printed on one side of the magnetic IC card 4 after predetermined information has been magnetically recorded on a magnetic stripe formed on the one side of the magnetic IC card 4, thereby avoiding the printed image from impressions by the transport rollers 8A to 11A, which would otherwise have occurred in the opposite sequence. Further, during magnetic recording, the rotary mechanism 20 in the rotary transport unit 6 may be inclined at a predetermined angle from a transport reference position, such that the leading end of the magnetic IC card 4, fed out along the transport path CR while information is being magnetically recorded thereon, comes in contact with the first or second flipper rollers 22, 23 of the rotary mechanism 20, thereby minimizing or preventing recording errors such as jitter or the like.

Further, by virtue of the rotary transport unit 6 disposed in front of the IC recording/reproducing unit 30, a magnetic IC card 4 sandwiched in the rotary mechanism 20 can be quite effectively inserted or extracted, for example, in the IC recording/reproducing unit 30 which records information on the magnetic IC card 4 and reproduces the recording information therefrom in a switchback manner, as in the foregoing embodiment.

A mechanism for detecting the ribbon code ring 105 for discriminating the type of the ink ribbon 47, required only when the ribbon cassette 41 is loaded into the card printer 1, is used as a mechanism for rotating the rotary mechanism 20 in the rotary transport unit 6, such that the ribbon code ring 105 is detected as required while it is rotated, thereby making it possible to significantly simplify the internal structure of the card printer 1 as compared with a card printer provided with a separately disposed mechanism for detecting the ribbon code ring 105.

Further, in the rotary transport unit 6, a range of rotary motion of the rotary mechanism 20 with respect to the supporting plate 70 is limited by a stopper comprising the gear 113 engaged with the output shaft 110A of the rotating motor 110. A rotating position of the rotating shield 114 coaxial with the gear 113 is detected by the optical sensor 115, thereby preventing wires or the like drawn from the rotary mechanism 20 from wrapping around the rotating shaft 21B.

Further, in the rotary transport unit 6, even if the magnetic IC card 4 sandwiched in the rotary mechanism 20 is ejected in a centrifugal direction with the rotation of the rotary mechanism 20, the transport motor 85 is always driven by a distance over which the magnetic IC card 4 is ejected, so that the magnetic IC card 4 sandwiched in the rotary mechanism 20 can be always maintained at a predetermined proper position.

(5) Effect of Operation of a Preferred Embodiment

In the card printer 1 configured as described above, the rotary transport unit 6 is rotatably disposed on the transport path CR for the magnetic IC card 4 such that the direction in which the magnetic IC card 4 is transported is switched by the rotary transport unit 6 in association with a sequence of operations performed by the color image printing unit 40, magnetic recording/reproducing unit (not shown) and IC recording/reproducing unit 30, thereby making it possible to realize the preferred card printer 1 which has a significantly reduced transport path length CR and a simplified overall configuration, and consequently provides multiple functions in a simple configuration.

(6) Other Embodiments

While the foregoing embodiment has been described in connection with the rotary transport unit 6 as illustrated in FIG. 7 as rotary transporting means, the present invention is not limited to the specific rotary transport unit as illustrated, but a variety of rotary transporting means having different structures may be widely applied as long as they can rotatably switch a card material in a desired transporting direction.

Also, while the foregoing embodiment has been described in connection with the magnetic IC card 4 conforming to the ISO standard which is employed as a card material, the present invention is not limited to this specific card but may employ a magnetic IC card conforming to the JIS standard or a card material having only a magnetic stripe or only an IC memory, or any other combination of magnetic or IC features in accordance with other available standardization schemes.

Also, while the foregoing embodiment has been described in connection with the magnetic recording/reproducing unit (not shown) and the IC recording/reproducing unit 30 which are implemented as magnetic recording means and memory recording means, the present invention is not limited to these specific units. In essence, the present invention can be widely applied to any recording means which supports any recording medium such as a magnetic recording medium or a semiconductor memory, or the like if it is disposed on one or the other side of a card material.

Further, while the foregoing embodiment has been described in connection with a thermal transfer type color printer which is employed as the color printer 1, the present invention is not limited to this particular printer, but may be widely applied to a variety of printers such as, for example, an ink jet printer, a thermal printer, a laser printer, and so on.

According to the present invention as described above, a sublimating card printing apparatus for printing an image on one side of a card material based on an image printing signal supplied thereto is provided with rotary transporting means rotatably disposed on a transport path for the card material for switching a direction in which the card material is transported, thereby permitting a reduction in the length of the transport path and a resulting simplification in the configuration of the entire apparatus, with the result that the sublimating card printing apparatus can provide multiple functions in a simple configuration.

Although the present invention has been shown and described with respect to preferred embodiments, various changes and modifications lie within the spirit and scope of the claimed invention. Thus, the corresponding structures, materials, acts, and equivalents of all means or step plus function elements in the claims are intended to include any structure, material, or acts for performing the functions in combination with other elements as specifically claimed.

What is claimed:

1. A sublimating card printing apparatus for recording predetermined information in a medium provided on a card and printing an image on the card, the image being based on a supplied printing signal, comprising:

recording predetermined information in the medium on the card;

detecting whether or not the predetermined information is correctly recorded in the medium;

transporting the card along a first transport path, after recording the predetermined information in the medium;

printing the image on the card, the image being based on the supplied printing signal;

detecting whether or not the image is correctly printed on the card;

transporting the card along a second transport path which is along a plane different than a plane along the first transport path, after printing the image on the card;

providing the card to a card tray along a third transport path, if either the image is not correctly printed on the card or the predetermined information is not correctly recorder in the medium, wherein the third transport path is along a plane different than the plane along the first transport path and the plane along the second transport path; and rotating the card at a single location, to align the card either along the first transport path, the second transport path or the third transport path.

2. The sublimating card printing method according to claim 1, wherein the medium comprises either a semiconductor memory or a magnetic recording medium and wherein recording predetermined information in the medium comprises either recording the predetermined information in the semiconductor memory or magnetically recording the predetermined information in the magnetic recording medium.

3. The sublimating card printing method according to claim 1, wherein the medium comprises a first medium comprising a semiconductor memory and a second medium comprising a magnetic recording medium, and wherein recording predetermined information in the medium comprises recording the predetermined information in the semiconductor memory and magnetically recording the predetermined information in the magnetic recording medium.

4. The sublimating card printing method according to claim 1 wherein a plane along the first transport path and a plane along the second transport path has an angular displacement within the range to 0 to 360 degrees from a plan along the third transport path.

5. The sublimating card printing method according to claim 1 wherein the rotating the card at a single location comprises rotating the card at the single location to align the card along one of a plurality of transport path including the first transport path, the second transport path and the third transport path.

6. The sublimating card printing method according to claim 5 wherein each of the plurality of transport paths is along a plane which is different than a plane along each other of the plurality of transport paths.

7. A sublimating card printing apparatus for recording predetermined information in a medium provided on a card and printing an image on the card, the image being based on a supplied printing signal, comprising:

means for recording predetermined information in the medium on the card;

means for transporting the card along a first transport path, after recording the predetermined information in the medium;

means for printing the image on the card, the image being based on the supplied printing signal;

means for transporting the card along a second transport path which is along a plane different than a plane along the first transport path, after printing the image on the card;

means for providing the card to a card tray along a third transport path, wherein the third transport path is along a plane different than the plane along the first transport path and the plane along the second transport path; and means for rotating the card at a single location, to align the card either along the first transport path, the second transport path or the third transport path.

8. The sublimating card printing apparatus according to claim 7 further comprising means for detecting whether or not the predetermined information is correctly recorded in the medium and means for detecting whether or not the image is correctly printed on the card.

9. The sublimating card printing apparatus according to claim 8, wherein the means for rotating the card aligns the card along the third transport path only if either means for detecting whether or not the predetermined information is correctly recorded in the medium determined that the predetermined information is not correctly recorded in the medium or the means for detecting whether or not the image is correctly printed on the card determined that the image is not correctly printed in the card.

10. The sublimating card printing apparatus according to claim 7 wherein a plane along the first transport path and a plane along the second transport path has an angular displacement within the range of 0 to 360 degrees from a plane along the third transport path.

11. The sublimating card printing apparatus according to claim 7 wherein the means for rotating the card at a single location is capable of rotating the card at the single location to align the card along one of a plurality of transport paths including the first transport path, the second transport path and the third transport path.

12. The sublimating card printing apparatus according to claim 7 further comprising position control means for controlling and alligning the card along either the first, second or third transport path.

13. The sublimating card printing apparatus according to claim 7 wherein the medium comprises either or both a semiconductor memory or a magnetic recording medium and wherein the means for recording predetermined information in the medium comprises either or both a means for recording the predetermined information in the semiconductor memory and a means for magnetically recording the predetermined information in the magnetic recording medium.

14. The sublimating card printing apparatus according to claim 7 further comprising ink ribbon code ring detecting means for detecting information on a type of ink ribbon, wherein the ink ribbon code ring detecting means is used with a rotation mechanism of the means for rotating, to rotate and detect a ribbon code ring as required.

* * * * *